United States Patent
Clercq

(10) Patent No.: US 7,555,787 B2
(45) Date of Patent: Jun. 30, 2009

(54) IC INTRUSION DETECTION

(75) Inventor: Mark Nadim Olivier Clercq, Eindhoven (NL)

(73) Assignee: NXP B.V., Eindhoven (NL)

( * ) Notice: Subject to any disclaimer, the term of this patent is extended or adjusted under 35 U.S.C. 154(b) by 6 days.

(21) Appl. No.: 10/590,388

(22) PCT Filed: Feb. 9, 2005

(86) PCT No.: PCT/IB2005/050509

§ 371 (c)(1), (2), (4) Date: Aug. 16, 2007

(87) PCT Pub. No.: WO2005/085972

PCT Pub. Date: Sep. 15, 2005

(65) Prior Publication Data

US 2008/0260150 A1    Oct. 23, 2008

(30) Foreign Application Priority Data

Feb. 24, 2004    (EP) ................... 04100716

(51) Int. Cl.
G06F 11/00 (2006.01)
H04L 9/32 (2006.01)
G06F 11/30 (2006.01)

(52) U.S. Cl. ................... 726/34; 726/35; 380/287; 713/194

(58) Field of Classification Search .................... 726/34
See application file for complete search history.

(56) References Cited

U.S. PATENT DOCUMENTS

| 5,861,652 | A | 1/1999 | Cole et al. |
| 6,467,083 | B1 * | 10/2002 | Yamashita ................... 717/128 |
| 2003/0035570 | A1 * | 2/2003 | Benkley, III ................ 382/124 |
| 2003/0132777 | A1 * | 7/2003 | Laackmann et al. ............ 326/1 |
| 2003/0218475 | A1 | 11/2003 | Gammel |

OTHER PUBLICATIONS

"A Digital BIST for Operational Amplifiers Embedded in Mixed-Signal Circuits" Rayane, IEEE VLSI Test Symposium, 1999, pp. 304-310.*

I. Rayane et al: "A Digital BIST for Operational Amplifiers Embedded in Mixed-Signal Circuits"; Proceedings of IEEE VLSI Test Symposium; 1999 pp. 304-310.

Khalkhal A et al: "On-Chip Measurement of Interconnect Capacitances in a CMOS Process"; Proceedings of the International Conf. on Microelectronic Test Structures NARA JP; Mar. 22-25, 1995; N.Y. IEEE US; Mar. 22, 1995; pp. 145-149.

* cited by examiner

Primary Examiner—Longbit Chai

(57) ABSTRACT

The invention relates to an electronic device for cryptographic processing, having at least two electronic circuits (IC, CC, CP) coupled via a connection means, wherein the connection means is arranged for transferring data signals between the two electronic circuits. The electronic device further has a monitoring circuit (401) arranged to monitor a deviation in the capacitance of the connection means. In case the deviation exceeds a predetermined value an alert signal (411) is generated.

18 Claims, 4 Drawing Sheets

IC INTRUSION DETECTION

TECHNICAL FIELD

The invention relates to an electronic device for cryptographic processing, comprising at least two electronic circuits coupled via a connection means, wherein the connection means is arranged for transferring data signals between the two electronic circuits.

The invention further relates to a method for cryptographic processing, using an electronic device comprising at least two electronic circuits coupled via a connection means, comprising the step of transferring data signals between the two electronic circuits via the connection means.

BACKGROUND ART

Cryptographic devices are used for the protection of information against unauthorized access to or modification of this information, whether in storage, processing or transit, and against the denial of service to authorized users. Examples of cryptographic devices are smart cards, secure identity tokens, mobile phone security systems, electronic purses, television de-scrambling devices, to name a few. Differential power analysis (DPA) is an established technique for retrieving information from cryptographic systems. The principle of differential power analysis is that the power consumption of a cryptographic device is measured, and this information is correlated with the behavior of logical gates and software running on the cryptographic device. In order to derive information on the power consumption profiles, signals generated by the cryptographic device have to be monitored using some form of a probe. By using suitable statistical techniques on a large set of power consumption profiles, secret parameters can be derived, such as the user's private key. Simple Power Analysis (SPA) is a simpler form of the attack that does not require statistical analysis. Besides the power consumption of a cryptographic device, also its electromagnetic radiation can be measured in order to derive secret parameters. Examples of the use of such secret parameters are encrypting or decrypting arbitary data, authenticating commands or requests, to name a few.

The level of protection of cryptographic devices against techniques such as power analysis attacks can be increased by randomizing or minimizing the power consumption of the device. For example, in "Energy-Aware Design Techniques for Differential Power Analysis Protection", Proceedings Design Automation Conference, 2003, page 36-41, 2-6 Jun., 2003, Benini et al. describe a cryptographic device having a first execution unit that implements all required functionality, and a second execution unit that only implements a part of the functionality of the first execution unit. Input data are either processed by the first execution unit or by the second execution unit. Due to the reduced functionality of the second execution unit, its power consumption is lower than that of the first execution unit, for a given input value. A selector determines which execution unit to activate in a given cycle, based on the observation of the input value, in order to alter the power consumption of the cryptographic device over time.

Irwin, J. et al., in "Instruction Stream Mutation for Non-Deterministic Processors", Proceedings of the IEEE International Conference on Application-Specific Systems, Architectures, and Processors, 2002, page 286-295 describe a non-deterministic processor having a so-called mutation unit that is located directly before the execution unit in the pipeline of the processor. The unit may therefore examine and operate on each instruction before dispatching it to the execution unit, using information on the liveness status of values in physical registers, stored in a dedicated table. Using this information, the mutation unit can verify which registers contain useful values and which registers contain values that may be overwritten. One operation performed by the mutation unit is to alter the instructions such that their meaning is the same while their register usage and mapping is different, using the concept of identity instructions. In this concept an instruction is added to an original instruction, such that the sequence of instructions has the same meaning as the original instruction, but resulting in a different power consumption profile. As long as an identity for a given instruction is available, the processor may decide at random to forward either the identity sequence or the original instruction to the execution unit.

It is a disadvantage of the prior art electronic devices that they only will make it harder to derive secret information from an electronic device for cryptographic processing. By increasing the number of measurements of power consumption profiles, which can easily be done by automating the process, it may still be possible to derive secret information from the electronic device.

DISCLOSURE OF INVENTION

It is an object of the invention to provide an electronic device for cryptographic processing that detects the presence of some form of probe used for deriving secret information from the electronic device.

This object is achieved with an electronic device according to the invention, characterized by a monitoring circuit arranged to monitor a deviation in the capacitance of the connection means and to generate an alert signal if the deviation exceeds a predetermined value. In order to derive secret information from an electronic device for cryptographic processing, some signals on the electronic device have to be measured, for example measuring the current or voltage signals of a connection means between two electronic circuits of the device. The use of some form of probe on a connection means of an electronic circuit will modify the capacitance of that connection means. By monitoring, directly or indirectly, changes in the capacitance of a connection means, the presence of a probe is detected and an alert signal can be generated.

An embodiment of the invention is characterized in that the monitoring circuit is arranged to monitor the data signals transferred via the connection means and to compare a monitored signal with a reference signal. As a result of the change in capacitance, the transition of a signal over the corresponding connection means will be changed by the presence of the probe. By monitoring the signal transition at a certain connection means, and, by comparing this signal with a reference signal, it can be determined if the monitored signal is different from the reference signal. If so, it is concluded that the electronic device is under attack for deriving secret information.

An embodiment of the invention is characterized in that the electronic circuits comprise a logical circuit and a storage element arranged to store data output by the logical circuit, and to provide a stable signal on the interface of the electronic circuit.

An embodiment of the invention is characterized in that the monitoring circuit is a propagation delay detection circuit. Due to the change in the capacitance, the propagation delay of the signal will be affected and this can be measured.

An embodiment of the invention is characterized in that the monitoring circuit is a slew-rate deviation detection circuit. Due to the change in the capacitance, the slew-rate of the signal will be affected and this can be measured.

An embodiment of the invention is characterized in that the monitoring circuit is arranged to monitor a value of the capacitance of the connection means and to compare the monitored value with a reference value. Directly monitoring the capacitance of the connection means has the advantage that the capacitance is not affected by variations in the voltage at which the electronic device operates.

An embodiment of the invention is characterized in that the reference signal is derived from a Monte-Carlo analysis performed on the electronic device. By deriving the reference signal from simulations no additional circuitry is required to generate the reference signal.

An embodiment of the invention is characterized in that the electronic device further comprises a dummy electronic circuit having at least a dummy connection means with a capacitance comparable to that of the connection means, and wherein the monitoring circuit is further arranged to determine the reference signal by monitoring the dummy connection means when transferring a data signal identical to that transferred via the connection means. An advantage of this embodiment is that external influences from, for example, other electronic devices will influence both the monitored signal and the reference signal. Consequently, such influences will not lead to an erroneous detection of deviations between the monitored signal and the reference signal, increasing the reliability of the device.

An embodiment of the invention is characterized in that the electronic device is further arranged to use the alert signal to power down at least a part of the electronic device. By powering down at least a part of the electronic device the retrieval of secret information from the device is prevented.

According to the invention a method for cryptographic processing is characterized in that the method further comprises the steps of monitoring a deviation in the capacitance of the connection means and generating an alert signal if the deviation exceeds a predetermined value. The use of some form of probe on a node of an electronic circuit will modify the capacitance of that connection means. By monitoring changes in the capacitance of a connection means, the presence of a probe is detected and an alert signal can be generated.

SHORT DESCRIPTION OF FIGURES

FIG. 1 shows an embodiment of an electronic device for cryptographic processing.

FIG. 2 schematically shows the interface between the cache controller and the instruction cache.

DESCRIPTION OF EMBODIMENTS

Figure 1:
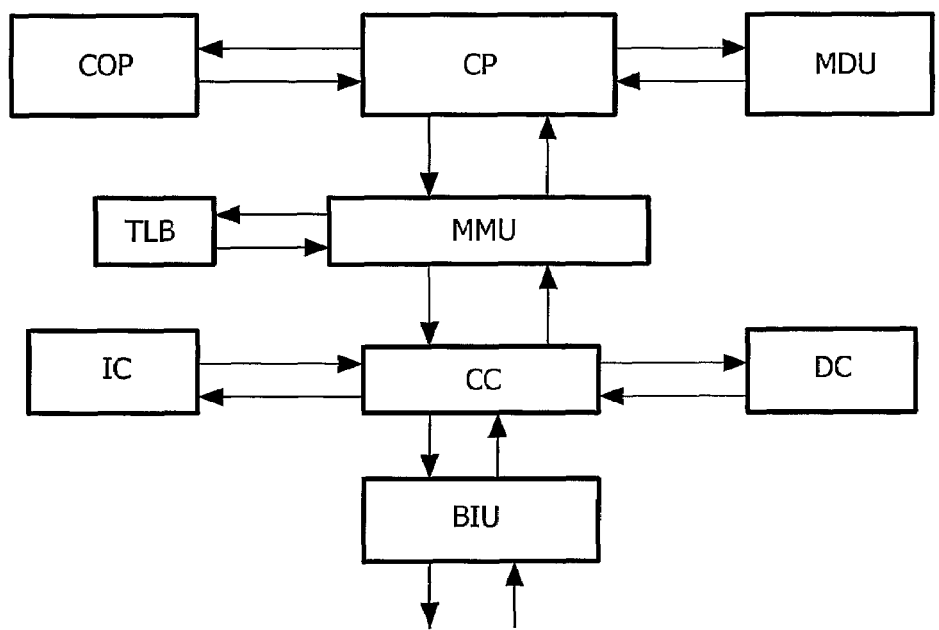

FIG. 1 shows an embodiment of an electronic device for cryptographic processing, which is for example a part of a smartcard. The electronic device comprises a number of units, i.e. a bus interface unit BIU, a cache controller CC, a data cache DC, an instruction cache IC, a memory management unit MMU, a translation lookaside buffer TLB, a core pipeline CP, a coprocessor COP and a multiply/divide unit MDU. The various units, i.e. electronic circuits, of the electronic device are coupled via a connection device as indicated by the arrows. For example, the coprocessor COP is coupled to the core pipeline CP for receiving data as well as instructions from, and outputting data to the core pipeline CP. The bus interface unit BIU is coupled to a data bus, not shown in FIG. 1, for receiving input data, and for sending output data. For example, the data received by the bus interface unit BIU is data that has to be encrypted by the electronic device, and the encrypted data is subsequently sent via the bus interface unit BIU to the data bus. In operation, the instructions required for the encryption algorithm are stored in the instruction cache IC and/or a main memory, not shown in FIG. 1. The core pipeline CP requests an instruction by sending a virtual memory address to the memory management unit MMU. This virtual memory address is translated into a physical memory address by the memory management unit MMU using the translation lookaside buffer TLB. Via the translation lookaside buffer TLB, the memory management unit MMU determines whether this instruction is available in the instruction cache IC. In case the instruction is available in the instruction cache IC, the instruction is retrieved from the instruction cache IC and sent to the core pipeline CP. Otherwise, the instruction must be fetched from the main memory, via the bus interface unit BIU. The required instruction and data to be processed are sent to the core pipeline CP for processing. The core pipeline CP determines whether the multiply/divide unit MDU or coprocessor COP should be invoked in the processing. The result data are sent either to the data cache DC or to the main memory via the bus interface unit BIU. In different embodiments, the electronic device may comprise a different number of units and/or units with a different functionality. For example, more coprocessors may be present for executing dedicated instructions, or no translation lookaside buffer is present.

Figure 2:
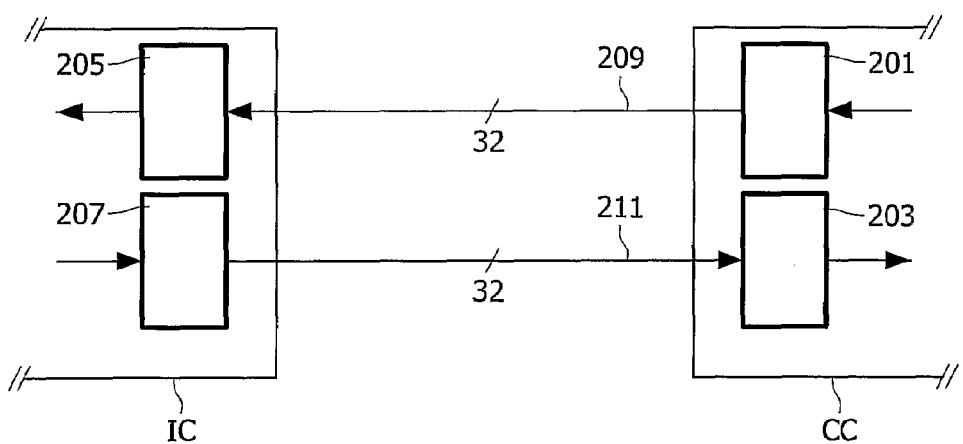
Figure 3:
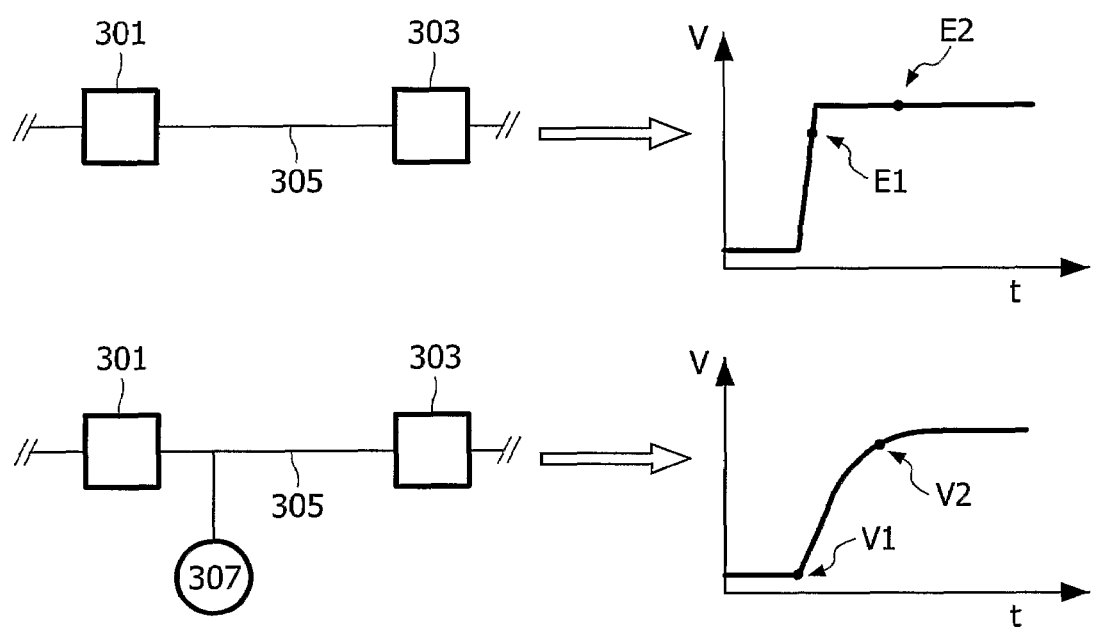
FIG. 3 shows the effect of a probe on the transition of a signal over a node connecting two electronic circuits.

FIG. 2 schematically shows the interface between the cache controller CC and the instruction cache IC. The cache controller CC comprises storage elements 201 and 203, respectively, while the instruction cache comprises storage elements 205 and 207, respectively. Storage elements 201 and 205 are coupled via address and data bus 209, whereas storage element 207 and 203 are coupled via data bus 211. Data busses 209 and 211 are, for example, 32 bit-wide data buses. In alternative embodiments a different connection device for coupling electronic circuits may be present, for example one or more direct wires or one bus combining busses 209 and 211. The storage elements 201-207 can be latches, i.e. known circuits that pass data elements from their inputs to their outputs when the clock signal, not shown in FIG. 2, has a first value and hold the output data when the clock signal has a second value. Alternatively, different circuits such as flip-flops can be applied, that hold data on an edge of a clock signal. On a clock signal, the data and address stored in storage element 201 of the cache controller CC is latched on the address and data bus 209. On the next rising edge of the clock, the data and addresses are read into storage element 205 of the instruction cache IC. In case anyone would like to derive secret information from the electronic device, a probe is placed on the address and data bus 209 to monitor the data signal, i.e. the current and/or voltage of the signal, between the cache controller CC and the instruction cache IC. However, the addition of the probe on the address and data bus 209 will modify the capacitance of the address and data bus 209 and will therefore also change the transition of a signal over the address and data bus. Referring to FIG. 3, two electronic circuits 301 and 303 are shown interconnected by a connection device 305. In the upper part of FIG. 3 a typical signal transition is shown as voltage versus time in case no probe is attached to the connection device 305. In the lower part of FIG. 3 a probe 307 is attached to connection device 305 for monitoring the flow of signals between electronic circuit 301 and 303, and a typical effect of the presence of the probe on the signal transition is shown in the voltage versus time diagram. Such an effect is to be expected due to the increase of the capacitance of the combined node 305 and probe 307, resulting in a slower slew-rate and increased delay in time of the signal. In case the increase in capacitance by the probe 307 is sufficiently high to cause a measurable change in signal transition, this change in signal transition can be detected.

Figure 4:
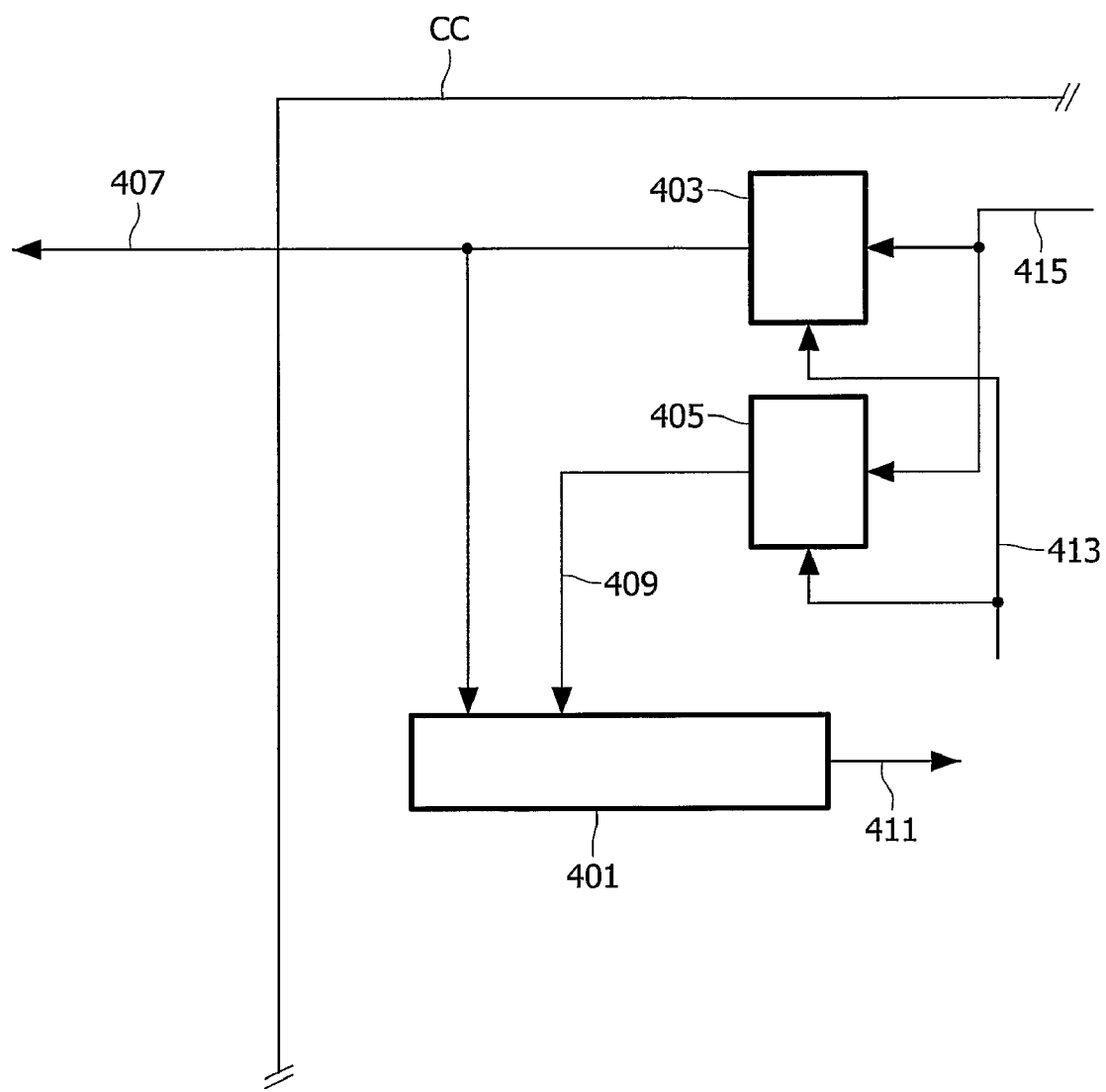
FIG. 4 shows a part of the cache controller comprising a propagation delay detection circuit.

FIG. 4 shows a part of the cache controller CC comprising a propagation delay detection circuit 401. The cache controller further comprises a storage element 403 and a dummy storage element 405. The storage elements 403 and 405 are used for storing the first address bit to be sent to the instruction cache, not shown in FIG. 4. It is noted that address bits are also considered to be data bits causing data signals when transferred via a connection device. The address and data bus 407 is coupled to storage element 403 and via this bus the first address bit is sent to the cache controller. Both the address and data bus 407 and the dummy storage element 405 are coupled to the propagation delay detection circuit 401. The circuitry comprising storage elements 403 and 405 as well as the propagation delay detection circuit 401 is be repeated for each address and data bit to be sent via the bus 407, for example a 32 bit-wide bus. In alternative embodiments, the dummy storage element 405 and detection circuit 401 are not repeated for every address and data bit to be sent via the bus 407, i.e. not all connections of data bus 407 are monitored. In operation, on a clock signal 413 generated by a synchronous clock generator, not shown in FIG. 4, the first bit of an address is stored via connection 415 in both storage element 403 and dummy storage element 405, by the cache controller CC. On a next clock signal 413, the first bit of the address stored in storage element 403 is latched on the corresponding connection of the address and data bus 407 while the same first bit of the address stored in dummy storage element 405 is latched on the connection device 409. The delay propagation detection circuit 401 samples the signal transition on the corresponding connection of bus 407 as a pair of values (V1, V2) representing the voltage level of the signal at two points in time. The delay propagation detection circuit 401 samples the signal transition on connection device 409 as well as a pair of values (E1, E2) representing the voltage level of the signal at the same two points in time. The pair of values (V1, V2) is compared to the pair of values (E1, E2) and if the pairs do not match then an alert signal 411 is generated by the delay propagation detection circuit 401. The pair of values (E1, E2) is the reference signal used for comparison with the actual signal (V1, V2), and therefore the capacitance of the connection device 409 should be comparable to that of the connection of the address and data bus 407 via which the address bit is sent to the instruction cache IC. In a similar way, each delay propagation detection circuit corresponding to another bit of the address and data bits compares its measured pairs of values (V1, V2) and (E1, E2) and generates an alert signal in case these do not match. The alert signal outputs of the propagation delay detection circuits can be combined using a tree of OR gates in order to generate one alert signal in case one or more of the individual propagation delay detection circuits generates an alert signal. The alert signal is used to power down the core pipeline CP, see FIG. 1, and so stopping all execution performed by the electronic device. Powering down includes both completely switching off as well as putting a unit in some form of a sleep mode. In case a probe is attached to the address and data bus 407 the signal transition over the corresponding connection of the bus is affected, as indicated in FIG. 3. The points in time for sampling by the propagation delay detection circuit can be chosen such that the pair (V1, V2) is equal to logical (0, 1) while that of the pair (E1, E2) is equal to logical (1, 1) for delays of the signal transition exceeding the natural variation in the signal transition, which then activates the alert signal 411. Otherwise, both pairs (V1, V2) and (E1, E2) are equal to (1, 1) and no alert signal is generated.

Figure 5:
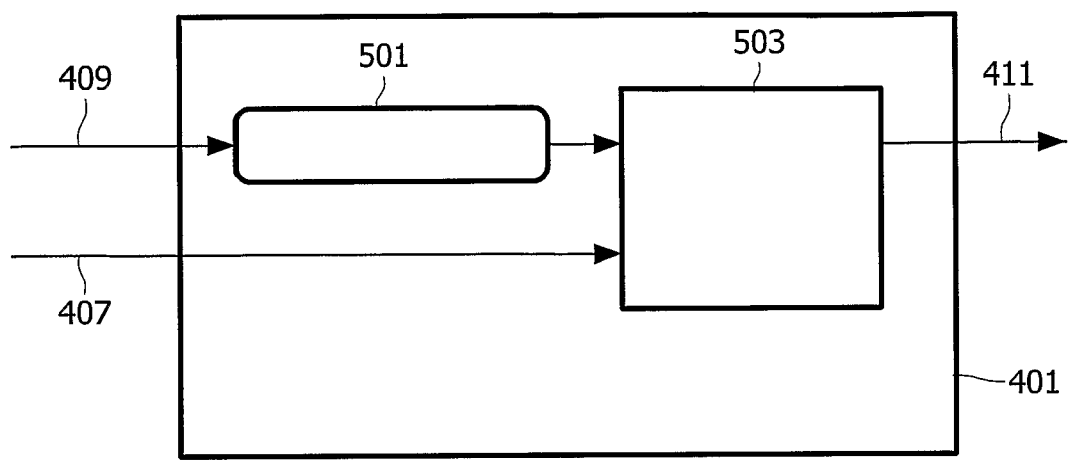
FIG. 5 shows an embodiment of the propagation delay detection circuit.

FIG. 5 shows an embodiment of the propagation delay detection circuit 401, sampling the signal transition of a connection of address and data bus 407 and that of connection device 409. The propagation delay detection circuit comprises a fine-tuned delay matcher 501 and a mutual exclusion element 503, and it arbitrates between the two received signals, i.e. the reference signal corresponding to connection device 409 and the actual signal corresponding to data bus 407. In case a probe is present to monitor the data bus 407, the actual signal is delayed when compared to the reference signal and as a result the mutual exclusion element 503 allows the reference signal to propagate, setting the alert signal 411. In case no probe is present, the actual signal should be allowed to propagate, in case of which the alert signal 411 is not set. In order to take natural variations in the transition of the actual signal into account, the dummy signal is delayed by the fine-tuned delay matcher 501. The fine-tuned delay matcher 501 delays the dummy signal such that for normal variations in delay of the actual signal no alert signal is generated, whereas in other cases an alert signal is generated.

Figure 6:
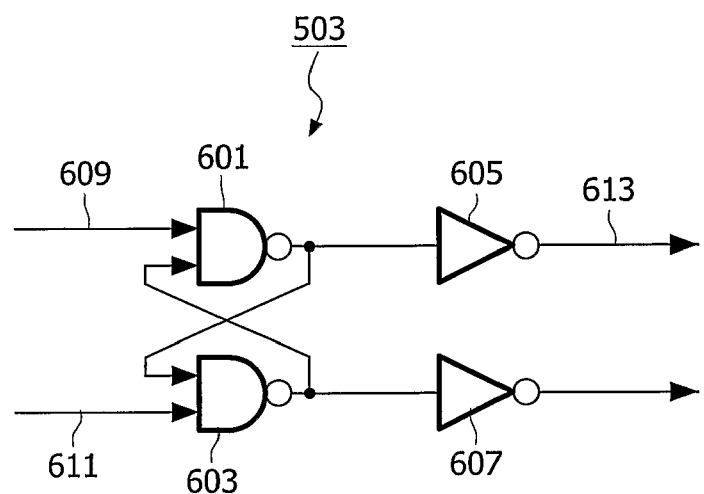
FIG. 6 shows an embodiment of a mutual exclusion element.

FIG. 6 shows an embodiment of the mutual exclusion element 503, comprising NAND gates 601 and 603 and logical inverters 605 and 607. Between two signal transitions, both the reference signal 609 and the actual signal 611 on the first input ports of NAND gates 601 and 603, respectively, are low. As a result, the signal on the second input ports of the NAND gates 601 and 603 is high. In case the actual signal 611 goes high before the reference signal 609 goes high, the signal on the second input port of NAND gate 601 goes low, and as a result the reference signal is blocked by NAND gate 601. The alert signal 613 remains low. In case the dummy signal 609 goes high before the actual signal 611, the actual signal 611 is blocked by NAND gate 603 and the alert signal 613 is set to high.

In an alternative embodiment the pair (E1, E2), representing the reference signal, is obtained from simulations using a Monte-Carlo analysis of the signal transitions on the address and data bus 407. The calculated reference signal can be stored in a memory of the propagation delay circuit and used for comparison with the samples from the signal transition on the address and data bus 407.

In a further alternative embodiment, a propagation delay circuit may be coupled to connection device between different units of the electronic device in order to prevent the retrieval of secret information from the device. Referring to FIG. 1, a propagation delay circuit is coupled to a connection device between the cache controller CC and the data cache DC, for example. Alternatively, propagation delay circuits may be coupled to connection devices between more than one pair of units, for example one coupled to the connection device between the cache controller CC and the instruction cache IC, as well one coupled to the connection device between the core pipeline CP and the coprocessor COP.

In another further alternative embodiment, the transition of the signal is monitored by a slew-rate detection circuit. The slew-rate detection circuit measures the slope of the transition of the signal, which represents the slew-rate. Referring to FIG. 2, the presence of a probe will also affect the slew-rate of a signal and by comparing the slew-rate of the actual signal and a reference signal, obtained either as a dummy signal or from Monte-Carlo simulations, it can be detected if the deviation between the slew-rate of the actual signal and the reference signal is larger that than expected from the natural variations in the signal transition. If the deviation is larger, an alert signal is generated. Circuit implementations for slew-rate deviation circuits, as well as alternative circuit implementations for propagation delay circuits, are given in "A Digital BIST for Operational Amplifiers Embedded in Mixed-Signal Circuits", I. Rayane et al., Proceedings of the IEEE VLSI Test Symposium, 1999, page 304-310.

In yet another further alternative embodiment, the capacitance of the connection for address and/or data transfer is monitored. Due to the presence of a probe the capacitance of the connection device will increase, and if the monitored value of the capacitance increases above a chosen threshold value, an alert signal is generated. Alternatively, the monitored value of the capacitance is compared with a reference value for the capacitance, stored in a memory, and if the deviation between the monitored value and the reference value is above a chosen threshold, an alert signal is generated. The capacitance of the connection device may be monitored continuously, or alternatively the capacitance is monitored at certain points in time. Circuits for on-chip capacitance measurement are described in "A new method and test structure for easy determination of femto-farad on-chip capacitances in a MOS process", Laquai B. et al., Proceedings of the International Conference on Microelectronic Test Structures, 1992, page 62-66; "On-chip measurement of interconnect capacitances in a CMOS process", Khalkhal A., Girard P. and Nouet, P., Proceedings IEEE 1994 Int. Conference on Microelectronic Test Structures, vol. 7, 1994, page 130-134; "An on-chip coupling capacitance measurement technique", Nair P. A. et al., Proceedings of the International Conference on VLSI Design, 2001, page 495-499.

Alternatively, the monitoring circuit of the electronic device monitors two or more properties related to the capacitance of the connection device, for example both the slew-rate as well as the propagation delay of the signal.

The invention can be applied in both synchronous and asynchronous electronic devices. In a synchronous device, at every clock signal new data is clocked into the storage elements, giving rise to a large current peak, which is relatively easily detectable by means of Differential Power Analysis, for example. In case of asynchronous systems, data is stored in a storage element if a corresponding electronic circuit has finished its processing. As a result, the currents peaks are reduced and more spread in time compared to a synchronous system. However, also for an asynchronous device secret information can still be derived using techniques such as Differential Power Analysis.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. An electronic device for cryptographic processing, comprising
    at least two electronic circuits coupled via a connection means, wherein the connection means comprises a bus having a plurality of address bit lines and a plurality of data bit lines arranged for transferring data signals between the two electronic circuits, wherein the data signals convey protected information, and
    a monitoring circuit arranged to monitor a deviation in the capacitance of the connection means and to generate an alert signal if the deviation exceeds a predetermined value, wherein the monitoring circuit is further configured to generate a plurality of alert signals, including up to one alert signal for each address bit line and data bit line that is monitored, wherein the monitoring circuit further comprises logic gates to combine the plurality of alert signals into a single alert signal and to output the single alert signal.

2. An electronic device for cryptographic processing according to claim 1, wherein the monitoring circuit is arranged to monitor the data signals transferred via the connection means and to compare a monitored signal with a reference signal.

3. An electronic device according to claim 2, wherein the monitoring circuit is a propagation delay detection circuit.

4. An electronic device according to claim 3, wherein the propagation delay detection circuit is configured to:
    perform a comparison of a plurality of signal values of the monitored signal with a plurality of signal values of the reference signal, and
    detect a propagation delay between the monitored signal and the reference signal based on the comparison of the signal values of the monitored signal and the reference signal.

5. An electronic device according to claim 2, wherein the monitoring circuit is a slew-rate deviation detection circuit.

6. An electronic device according to claim 5, wherein the slew-rate deviation detection circuit is configured to:
    perform a comparison of a plurality of signal values of the monitored signal with a plurality of signal values of the reference signal, and
    detect a slew-rate deviation between the monitored signal and the reference signal based on the comparison of the signal values of the monitored signal and the reference signal.

7. An electronic device according to claim 2, wherein the reference signal is derived from a Monte-Carlo analysis performed on the electronic device.

8. An electronic device according to claim 2, wherein the electronic device further comprises a dummy electronic circuit having at least a dummy connection means with a capacitance comparable to that of the connection means, and wherein the monitoring circuit is further arranged to determine the reference signal by monitoring the dummy connection means when transferring a data signal identical to that transferred via the connection means.

9. An electronic device according to claim 1, wherein the electronic circuits comprise a logical circuit and a storage element arranged to store data output by the logical circuit.

10. An electronic device according to claim 1, wherein the monitoring circuit is arranged to monitor a value of the capacitance of the connection means and to compare the monitored value with a reference value.

11. An electronic device according to claim 1, wherein the electronic device is further arranged to use the alert signal to power down at least a part of the electronic device.

12. An electronic device according to claim 1, wherein the monitoring circuit is further configured to generate the alert signal in response to detection of a probe electrically coupled to the connection means, wherein the probe is electrically coupled to the connection means to gain unauthorized access to the protected information conveyed by the data signals.

13. An electronic device according to claim 1, wherein the monitoring circuit is further configured to monitor the deviation in the capacitance of the connection means by monitoring two or more properties related to the capacitance of the connection means, wherein the properties related to the capacitance of the connections means comprise capacitance, propagation delay, and slew-rate deviation.

14. An electronic device according to claim 1, wherein the monitoring circuit is further configured to monitor all of the address and data bit lines of the bus.

15. A method for cryptographic processing, using an electronic device comprising at least two electronic circuits coupled via a connection means, comprising
- transferring data signals between the two electronic circuits via the connection means comprising a bus having a plurality of address bit lines and a plurality of data bit lines, wherein the data signals convey protected information,
- monitoring a deviation in the capacitance of the connection means,
- generating a plurality of alert signals, including up to one alert signal for each address bit line and data bit line that is monitored, if the deviation exceeds a predetermined value, and
- combining the plurality of alert signals through logic gates into a single alert signal to output the single alert signal.

16. A method according to claim 15, wherein monitoring the deviation in the capacitance of the connection means further comprises monitoring a propagation delay between the monitored signal and a reference signal, the method further comprising:
- performing a comparison of a plurality of signal values of the monitored signal with a plurality of signal values of the reference signal, and
- detecting a propagation delay between the monitored signal and the reference signal based on the comparison of the signal values of the monitored signal and the reference signal.

17. A method according to claim 15, wherein monitoring the deviation in the capacitance of the connection means further comprises monitoring a slew-rate deviation between the monitored signal and a reference signal, the method further comprising:
- performing a comparison of a plurality of signal values of the monitored signal with a plurality of signal values of the reference signal, and
- detecting a slew-rate deviation between the monitored signal and the reference signal based on the comparison of the signal values of the monitored signal and the reference signal.

18. A method according to claim 15, wherein monitoring the deviation in the capacitance of the connection means further comprises:
- directly monitoring a capacitance of the connection means, and
- comparing the capacitance of the connection means to a threshold.

* * * * *